(12) United States Patent
Takeuchi et al.

(10) Patent No.: US 7,224,662 B2
(45) Date of Patent: May 29, 2007

(54) OBJECTIVE LENS FOR OPTICAL PICKUP

(75) Inventors: Shuichi Takeuchi, Saitama-ken (JP); Koichi Maruyama, Tokyo (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 642 days.

(21) Appl. No.: 10/430,212

(22) Filed: May 7, 2003

(65) Prior Publication Data

US 2003/0210639 A1 Nov. 13, 2003

(30) Foreign Application Priority Data

May 8, 2002 (JP) .............................. 2002-133140

(51) Int. Cl.
*G11B 7/135* (2006.01)
(52) U.S. Cl. ............................ 369/112.12; 369/112.13; 369/112.26
(58) Field of Classification Search ...................... None
See application file for complete search history.

(56) References Cited

U.S. PATENT DOCUMENTS

| | | | |
|---|---|---|---|
| 5,844,879 A * | 12/1998 | Morita et al. ............... | 369/118 |
| 5,909,424 A | 6/1999 | Lee et al. | |
| 6,043,912 A | 3/2000 | Yoo et al. | |
| 6,088,322 A | 7/2000 | Broome et al. | |
| 6,118,594 A | 9/2000 | Maruyama | |
| 6,147,955 A | 11/2000 | Lee et al. | |
| 6,192,021 B1 * | 2/2001 | Saito et al. ................ | 369/53.2 |
| 6,198,714 B1 | 3/2001 | Yoo et al. | |
| 6,222,812 B1 | 4/2001 | Yoo et al. | |
| 6,259,668 B1 | 7/2001 | Lee et al. | |
| 6,272,096 B2 | 8/2001 | Yoo et al. | |
| 6,275,461 B1 | 8/2001 | Yoo et al. | |
| 6,304,540 B1 | 10/2001 | Yoo et al. | |
| 6,480,344 B1 | 11/2002 | Maruyama | |
| 6,556,534 B2 * | 4/2003 | Shimozono ............ | 369/112.26 |
| 6,594,222 B2 | 7/2003 | Maruyama | |
| 6,728,042 B2 * | 4/2004 | Ota et al. .................... | 359/637 |
| 6,807,139 B2 * | 10/2004 | Sakamoto .............. | 369/112.07 |

FOREIGN PATENT DOCUMENTS

JP 11-86314 3/1999

* cited by examiner

*Primary Examiner*—Andrea Wellington
*Assistant Examiner*—Michael V. Battaglia
(74) *Attorney, Agent, or Firm*—Greenblum & Bernstein, P.L.C.

(57) ABSTRACT

An objective lens for an optical pickup is configured such that, when a light beam having a wavelength corresponding to the optical disc requiring the higher NA is converged on the optical disc requiring the higher NA at the higher NA, the phase of light flux passed through the peripheral area is substantially the same as that passed through the central area. When a light beam having a wavelength corresponding to the optical disc requiring the lower NA is converged on the optical disc requiring the lower NA at the lower NA, the phase of light flux passed through a first annular region included in the peripheral area is different from that passed through the central area, and the phase of light flux passed through a second annular region, which is outside the first region, is substantially the same as that passed through the central area.

9 Claims, 10 Drawing Sheets

ZONE No.17

ZONE No.20

ZONE No.21

ZONE No.22

ZONE No.26

ZONE No.17

ZONE No.20

ZONE No.21

ZONE No.22

ZONE No.23

ZONE No.24

ZONE No.28

ZONE No.12

ZONE No.15

ZONE No.17

ZONE No.12

ZONE No.15

ZONE No.16

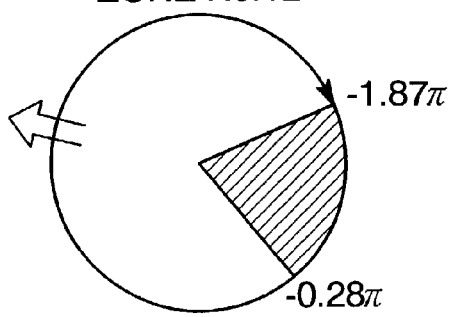
FIG.13A
ZONE No.12
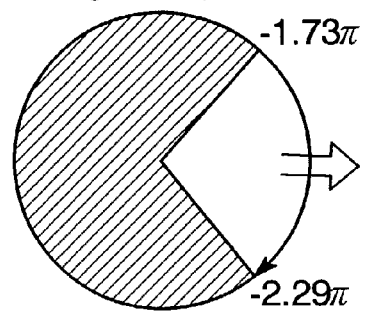
FIG.13B
ZONE No.15
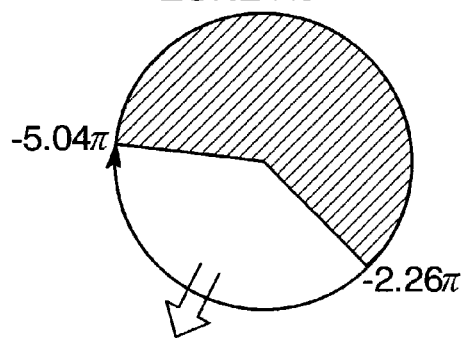
FIG.13C
ZONE No.17
FIG.14
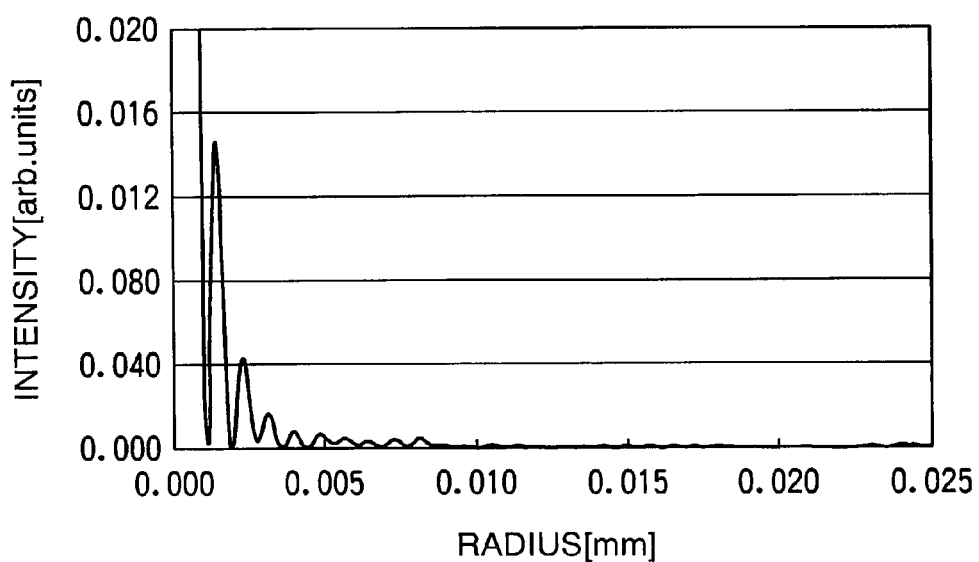

OBJECTIVE LENS FOR OPTICAL PICKUP

BACKGROUND OF THE INVENTION

The present invention relates to an objective lens of an optical pickup for at least two types of optical discs requiring different NAs (numerical apertures).

Generally, recording density on an optical disc is closely related to a beam spot size formed on a data recording surface of the optical disc. That is, the beam spot size should be neither too large nor too small in view of a track width on the data recording surface. If the recording density of the data is relatively high, the track width becomes narrower, and thus, the beam spot size should also be smaller. If the recording density is relatively low, the track width is wider, and thus, the beam spot size should also be larger. If the spot size is too large with respect to the track width, information on an adjoining track may be mixed as a noise component (which is known as a cross-talk), while if the beam spot size is too small with respect to the track width, and, in particular, when a data reproducing method makes use of a diffraction of light as in a CD reading system, a sufficient diffraction effect cannot be obtained and some signals may not be reproduced under such a condition.

The size of the beam spot formed by a laser beam is smaller as the NA of the optical system is larger. If the disc is a DVD (Digital Versatile Disc) or an MO (Magneto-Optical disk), which has a relatively high recording density, the optical system is required to be the high-NA system, while if the disc is a CD whose recording density is relatively low, the optical system is required to be the low-NA system. If a common objective lens is used for both the DVD (or MO) and the CD, it is necessary to limit the diameter of the beam when the CD is used so that the NA does not become too large. For this purpose, there is known an objective lens provided with a diffraction lens structure, which functions to confine the beam for the CDs.

If the beam is confined using the diffraction lens structure when the CD is used, a ring of light (known as a side lobe) is formed. If the intensity of the side lobe is relatively strong, an S/N ratio of a reproduced signal increases.

SUMMARY OF THE INVENTION

The present invention is advantageous in that an improved objective lens is provided, with which, even if the beam is confined for the optical disc requiring the low-NA optical system, the side lobe can be well suppressed.

According to an aspect of the invention, there is provided an objective lens for an optical pickup, the optical pickup being capable of converging at least two beams having different wavelengths on data recording surfaces of at least two different optical discs at different NAs, respectively.

The objective lens has a refractive lens having a positive power, at least one surface of the refractive lens being divided into a central area having a necessary size for transmitting a lower NA beam, which is converged on an optical disc at a lower NA and a peripheral area having a size for transmitting a higher NA beam which is converged on an optical disc at a higher NA.

The objective lens is configured such that, when a light beam having a wavelength corresponding to the optical disc requiring the higher NA is converged on the optical disc requiring the higher NA at the higher NA, the phase of light flux passed through the peripheral area is substantially the same as the phase of light flux passed through the central area. Further, when a light beam having a wavelength corresponding to the optical disc requiring the lower NA is converged on the optical disc requiring the lower NA at the lower NA, the phase of light flux passed through a first annular region included in the peripheral area is different from the phase of light flux passed through the central area, and the phase of light flux passed through a second annular region, which is included in the peripheral area and outside the first region, is substantially the same as the phase of the light flux passed through the central area.

Optionally, the objective lens satisfies a condition:

$$1.15 < h_S/h_B < 1.28,$$

where, $h_S$ represents a height of a boundary between the first annular region and the second annular region with respect to an optical axis of the objective lens, and $h_B$ represents a height of a boundary between the central area and the peripheral area.

Further optionally, a peripheral area is formed with a diffraction lens structure including a plurality of annular zones having level differences therebetween, the second annular region including a plurality of annular zones.

Still optionally, the plurality of annular zones included in the second annular region are adjacent to each other, an optical path difference at a boundary of each of adjacent annular zones is one wavelength when the light beam for the disc requiring the higher NA is used.

Alternatively, the plurality of annular zones formed in the peripheral area include a wide annular zone which has a wide width in a radial direction thereof, a phase difference of phases between light flux passed through a central area side end of the wide annular zone and light flux passed through the peripheral area side end of the wide annular zone being greater than $\pi$ when the light beam for the disc requiring the lower NA is used.

Still alternatively, the plurality of annular zones formed in the second region include a wide annular zone which has a wide width in a radial direction thereof, a phase difference of phases between light flux passed through the central area side end of the wide annular zone and light flux passed through the peripheral area side end of the wide annular zone being greater than $2\pi$ when the light beam for the disc requiring the lower NA is used.

Optionally, a phase of light flux passed through the first annular region is substantially reversed with respect to a phase of light flux passed through the central area when the light beam for the disc requiring the lower NA is used.

According to another aspect of the invention, the objective lens may be configured such that, when a light beam having a wavelength corresponding to the optical disc requiring the higher NA is converged on the optical disc requiring the higher NA at the higher NA, all of the plurality of annular zones formed in the peripheral area function to strengthen an intensity of a central portion of a beam spot. Further, when a light beam having a wavelength corresponding to the optical disc requiring the lower NA is converged on the optical disc requiring the lower NA at the lower NA. A plurality of annular zones included in the first annular region do not function of strengthening the intensity of the central portion of a beam spot, and a plurality of annular zones included in a second region defined outside the first annular region have a function of strengthening the intensity of the central portion of the beam spot.

Optionally, the objective lens satisfies a condition:

1.15<$h_S/h_B$<1.28, wherein, $h_S$ represents a height of a boundary between the first annular region and the second annular region with respect to an optical axis of the objective lens, and $h_B$ represents a height of a boundary between the central area and the peripheral area.

BRIEF DESCRIPTION OF THE ACCOMPANYING DRAWING

FIGS. 1A-1C shows front view, cross-sectional side view, and partially enlarged cross-sectional side view of an objective lens according to an embodiment;

FIG. 2 schematically shows a structure of an optical system of an optical pickup employing the objective lens shown in FIGS. 1A-1C;

FIG. 3 schematically shows a side view of an objective lens according to a first embodiment and a DVD;

FIG. 4 indicates a rule for expressing wavefront aberration by a circle graph;

Figure 10:
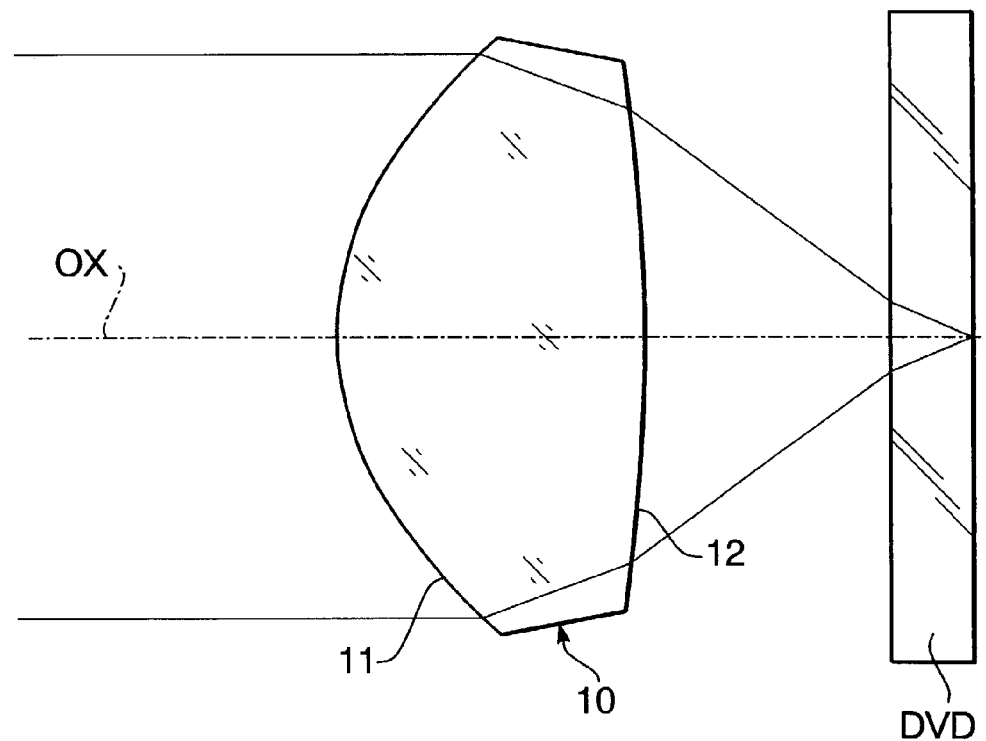
Figure 11A:
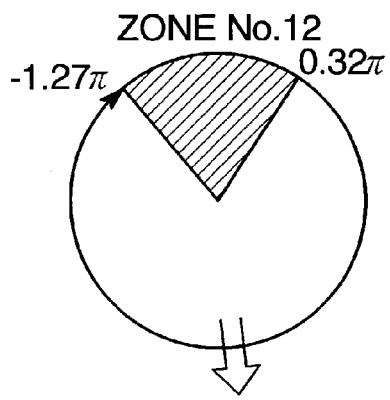
Figure 11B:
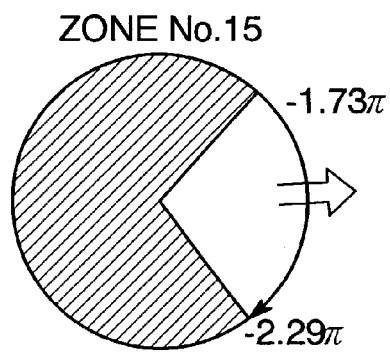
Figure 11C:
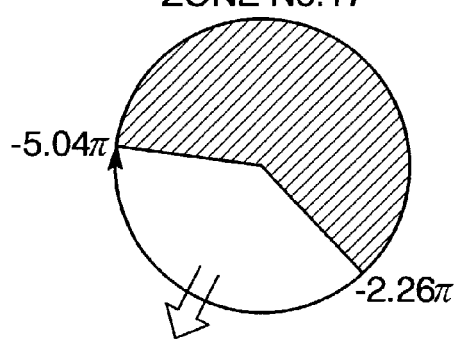
Figure 12A:
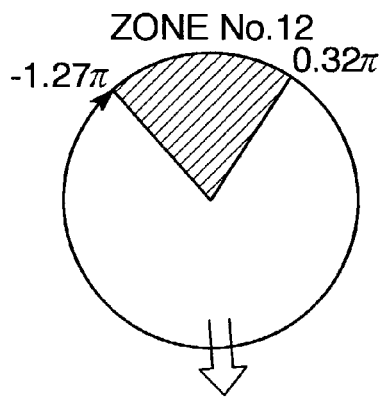
Figure 12B:
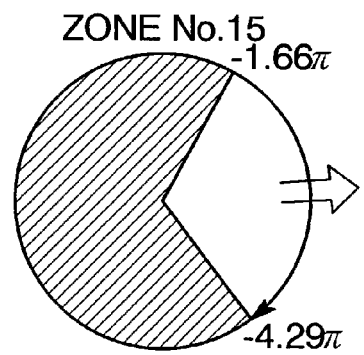
Figure 12C:
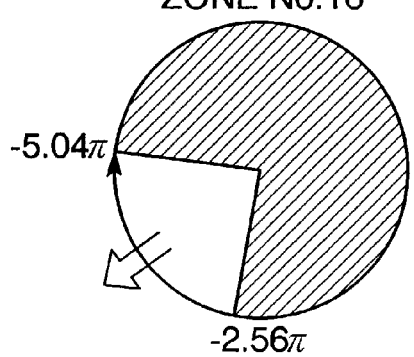
Figure 15:
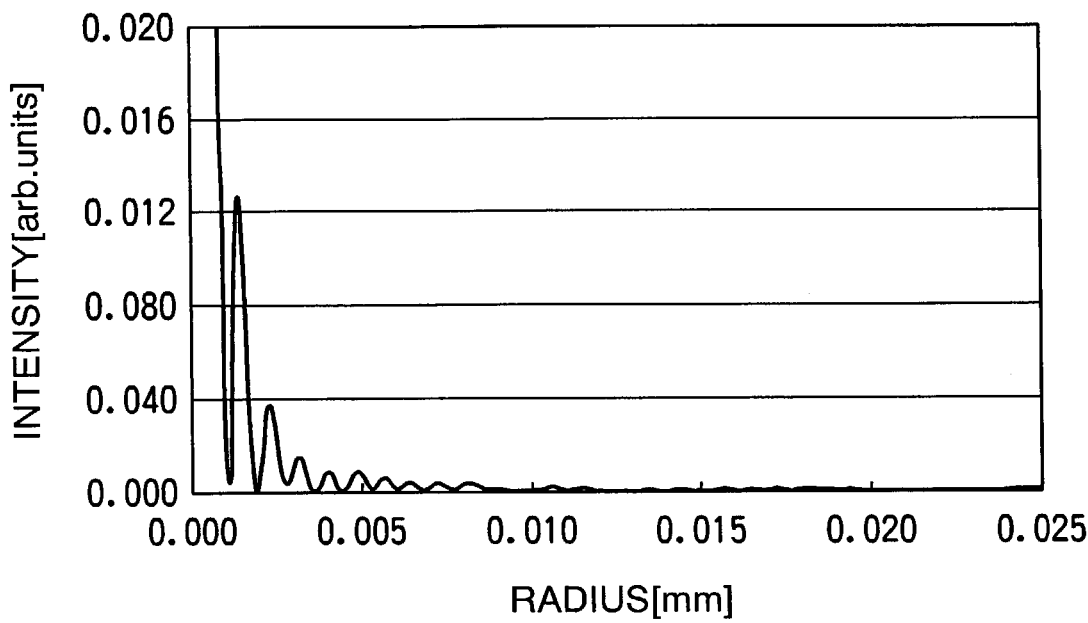
Figure 16:
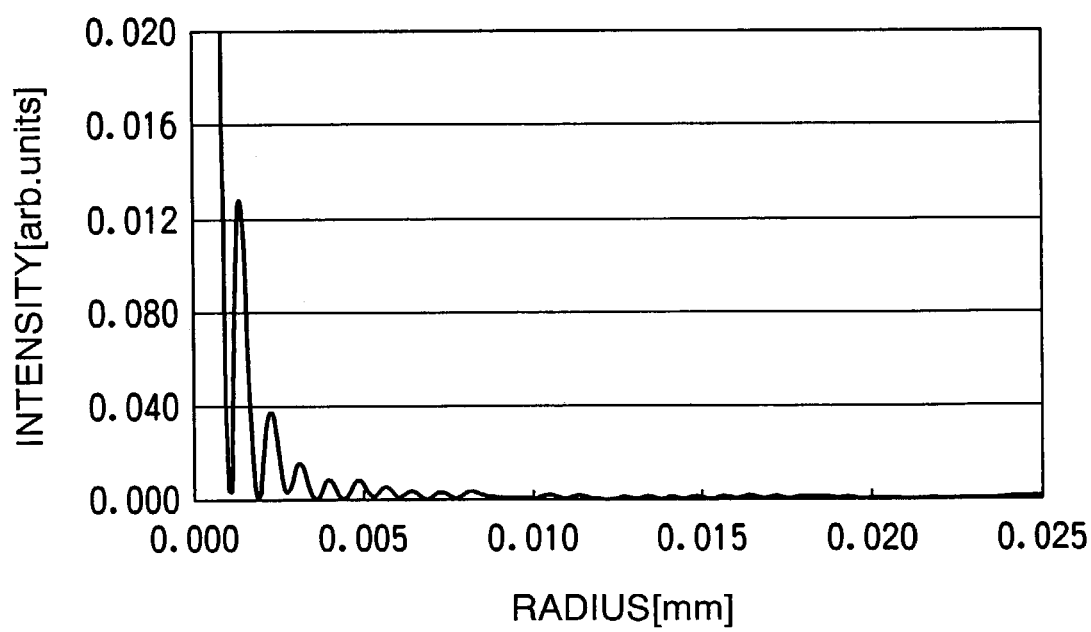
Figure 17:
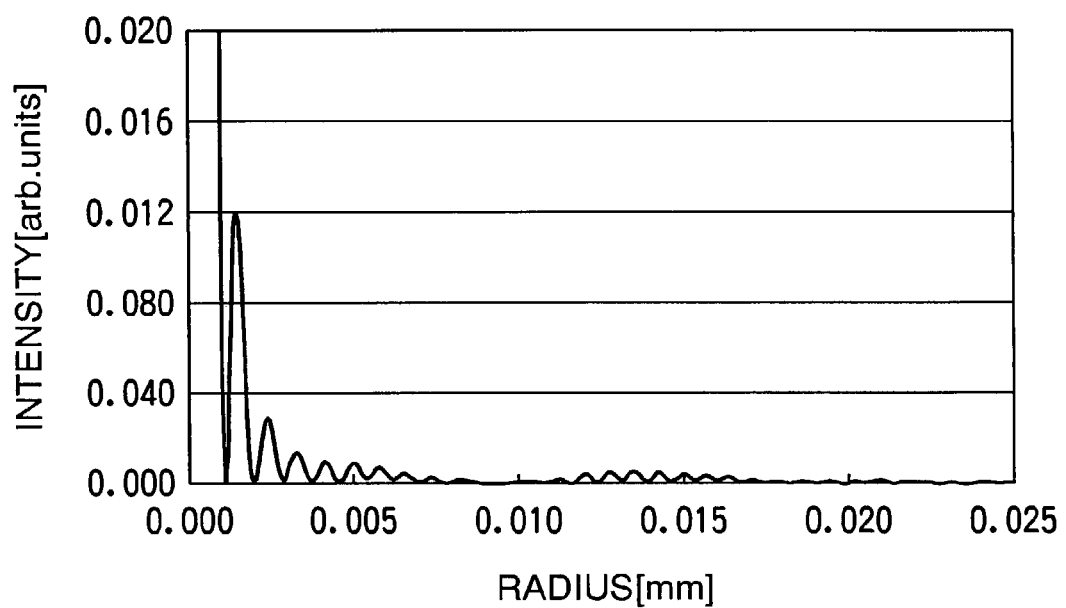

FIG. 10 schematically shows a side view of an objective lens according to a third embodiment and the DVD;

FIGS. 11A-11C are circle graphs showing changes of the wavefront aberration when a beam having a wavelength of 789 nm is incident on the objective lens according to the third embodiment;

FIGS. 12A-12C are circle graphs showing changes of the wavefront aberration when a beam having a wavelength of 789 nm is incident on the objective lens according to a fourth embodiment;

FIGS. 13A-13C are circle graphs showing changes of the wavefront aberration when a beam having a wavelength of 789 nm is incident on the objective lens according to a fifth embodiment;

FIG. 14 shows light intensity distribution on a recording surface of a CD when an objective lens according to a second comparative example is used;

FIG. 15 shows light intensity distribution on a recording surface of a CD when an objective lens according to the third embodiment is used;

FIG. 16 shows light intensity distribution on a recording surface of a CD when an objective lens according to the fourth embodiment is used; and FIG. 17 shows light intensity distribution on a recording surface of a CD when an objective lens according to the fifth embodiment is used;

DETAILED DESCRIPTION OF THE EMBODIMENTS

Hereinafter, objective lenses according to the embodiments will be described with reference to the accompanying drawings.

The objective lenses according to the embodiments are used for an optical pickup of an optical data record/readout apparatus, which uses both DVDs requiring a high-NA optical system and CDs/CD-Rs requiring a low-NA optical system. The objective lens converges laser beams emitted by semiconductor laser sources (e.g., laser diodes) onto optical discs.

Figures 1A, 1B, 1C:
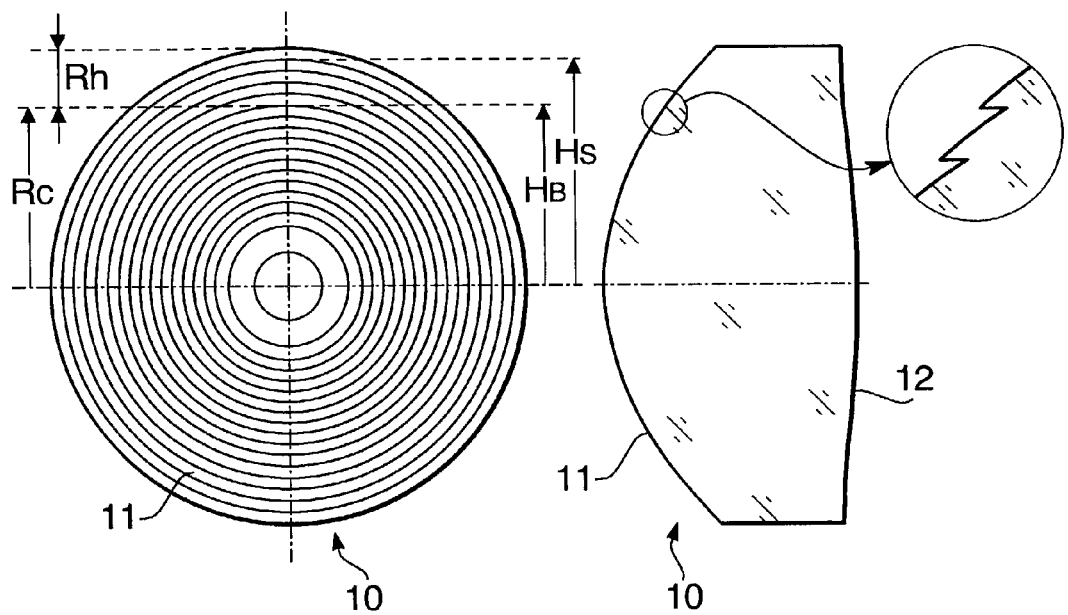

FIGS. 1A-1C shows front view, cross-sectional side view, and partially enlarged cross-sectional side view of an objective lens 10 according to an embodiment of the invention.

The objective lens 10 is a biconvex plastic lens having two aspherical convex surfaces 11 and 12. One surface 11 is divided into two areas: a central area Rc corresponding to a low-NA beam necessary for the CDs and CD-Rs, which have a relatively low recording density; and a peripheral area Rh, which is outside the central area Rc, corresponding to a high-NA beam necessary for the DVDs, which have a relatively high recording density. The central area Rc is defined as an area inside a portion where a light beam whose NA is approximately 0.5 is incident.

On the surface 11, over the entire area thereof including the central and peripheral areas Rc and Rh, a diffraction lens structure having a plurality of annular zones centering around the optical axis of the objective lens is formed. As indicated in FIG. 1C, the diffraction lens structure has level differences at boundaries of the annular zones in a direction of the optical axis OX.

Figure 2:
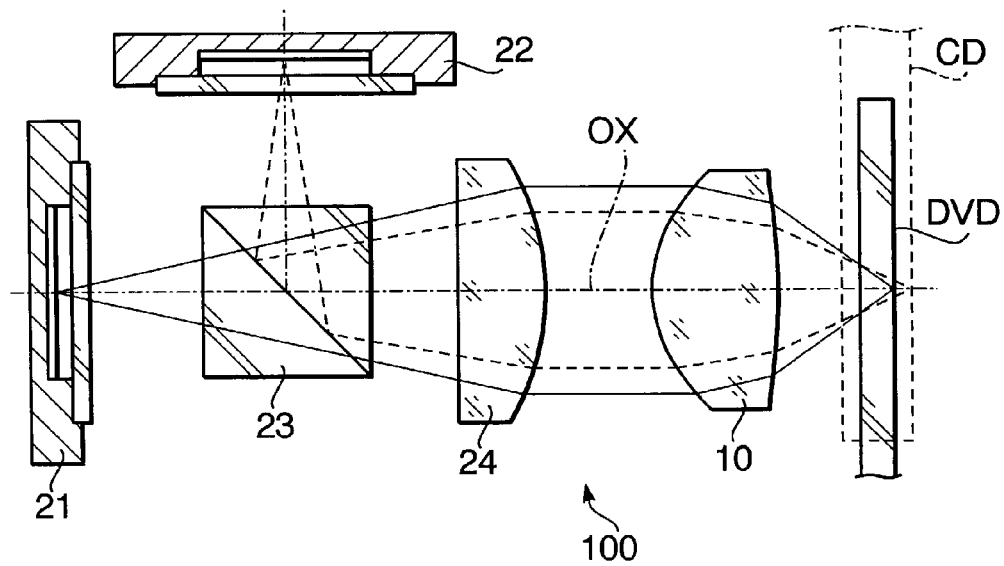

FIG. 2 schematically shows a structure of an optical system 100 of an optical pickup employing the objective lens 10 shown in FIGS. 1A-1C. The optical system 100 including a DVD light source module 21, a CD light source module 22, a beam combiner 23, a collimating lens 24 and the objective lens 10. Each of the DVD light source module 21 and the CD light source module 22 is an element having an integrally formed laser diode and photo sensor.

For the DVDs having the higher recording density, a light beam having a relatively short wavelength (which will be referred to as a shorter wavelength) is used in order to form a relatively small beam spot. For the CDs and/or CD-Rs having the lower recording density, a light beam having a relatively long wavelength (which will be referred to as a longer wavelength) is used in order to form a relatively large beam spot. Further, at least for the CD-Rs, due to its spectral reflectivity, a near infrared light beam should be used. Therefore, in this embodiment, the DVD light source module 21 is provided with a laser diode which emits a laser beam whose wavelength is 660 nm or 657 nm, and the CD light source module 22 is provided with a laser diode which emits a laser beam whose wavelength is 789 nm or 790 nm.

When the DVD is used (indicated by solid lines), the DVD light source module 21 is used. The laser beam (whose wavelength is 660 nm or 657 nm) emitted by the laser diode of the DVD light source module 21 converges on the data recording surface of the DVD as indicated by the solid lines in FIG. 2. When the CD or CD-R is used (indicated by broken lines), the CD light source module 22 is used. The laser beam (whose wavelength is 789 nm or 790 nm) emitted by the laser diode of the CD light source module 22 converges on the data recording surface of the CD (or CD-R) as indicated by the broken lines in FIG. 2.

The diffraction lens structure formed in the central area Rc of the objective lens 10 is designed such that the diffraction efficiency for the first order diffraction light is maximum with respect to the wavelengths respectively used for the DVDs and CDs (or CD-Rs). Further, the diffraction lens structure formed in the central area RC is configured such that the change of the spherical aberration due to the difference of cover layers of the DVD (0.6 mm) and the CD or CD-R (1.2 mm) is compensated by switching the wavelength of the beam to be used. That is, the diffraction lens structure formed in the central area Rc provides spherical aberration which has a wavelength dependency such that when the wavelength of the incident beam increases the spherical aberrations change in an undercorrected direction.

The spherical aberration of the optical system generally changes in the overcorrected direction as the thickness of the cover layer of the optical disc increases. For the DVDs, which have a thinner cover layer, the shorter wavelength light is used, and for the CDs or CD-Rs, which have a thicker cover layer, the longer wavelength light is used. Thus, as described above, if the diffraction lens structure provides the spherical aberration which changes in the undercorrected direction as the wavelength increases, the change of the spherical aberration due to the change of the thickness of the cover layer can be cancelled by the change of the spherical aberration of the diffraction lens due to the change of the wavelengths.

The diffraction lens structure formed in the peripheral area Rh is designed such that, when the shorter wavelength beam corresponding to the DVD is used, a phase of the light flux passed through the peripheral area Rh is substantially the same as a phase of the light flux passed through the central area Rc. Further, when the longer wavelength beam corresponding to the CD or CD-R is used, a phase of light flux passed through a first annular region of the peripheral area Rh is different from the phase of the light flux passed through the central area Rc, and the phase of the light flux passed through a second annular region outside the first annular region is substantially the same as the phase of the light flux passed through the central area Rc. The first and second annular regions will be described in detail later.

By designing the annular zones in the peripheral area Rh as described above, it becomes possible to lower the intensity of the side lobe by interference of the light beam having the wavelength corresponding to the CDs or CD-Rs. Further, it is also prevented that the spot size is reduced excessively.

Further, the objective lens 10 should be configured to satisfy condition (1) below:

$$1.15 < h_S/h_B < 1.28 \tag{1}$$

where, $h_S$ is the height of the boundary between the first annular region and the second annular region with respect to the optical axis, $h_B$ is a height, with respect to the optical axis, of the boundary between the central area Rc and the peripheral area Rh.

When the condition (1) is satisfied, the intensity of the center of the beam spot is increased, and particularly the first side lobe can be well suppressed.

A plurality of annular zones in the second annular region are arranged next to each other, and are configured such that an optical path difference at each boundary of the annular zones is equal to one wavelength of the light beam for the DVDs (i.e., the shorter wavelength). It should be noted that the optical path difference at each boundary may be an integer multiple of one wavelength. However, in order to improve the effect of suppressing the side lobe intensity, it is preferable to set the optical path difference to one wavelength so that the first order diffraction light is used. If a higher order diffraction light is used, the width of the annular zone becomes longer. In such a case, although the light flux passed through the second region and the central area Rc have the same phase as a whole for the wavelength corresponding to the CDs, the light flux passed through the second region may include components which does not have the same phase as the light flux passed through the central area Rc. If the first order diffraction light is used, when the wavelength is for the DVDs, the width of each annular zone is relatively small. Therefore, for the wavelength corresponding to the CDs, annular zones which only provides the same phase as the phase of the light passed through the central area Rc are used. Accordingly, when the first order diffraction light is used, the effect of suppressing the side lobe is improved.

Further, a plurality of annular zones formed in the peripheral area Rh include one or more annular zones which is (are) designed such that, for the wavelength corresponding to the CD, a phase difference between a phase of light flux passing an optical axis side end of the annular zone and a phase of light flux passing a peripheral side end of the same annular zone is greater than $\pi$. By including such annular zones, a flare at a peripheral portion of a beam spot on an image surface can be diffused without affecting the intensity of the central portion or side lobe.

Alternatively or optionally, a plurality of annular zones included in the second annular area may be configured to include wide annular zones which are designed such that, for the wavelength corresponding to the CD, a phase difference between a phase of light flux passing an optical axis side end of the wide annular zone and a phase of light flux passing a peripheral side end of the same wide annular zone is greater than $2\pi$. In this case, the flare at a peripheral portion of the beam spot on an image plane can be diffused with suppressing the side lobe.

Next, five embodiments of the objective lens will be described.

Embodiment 1

Figure 3:
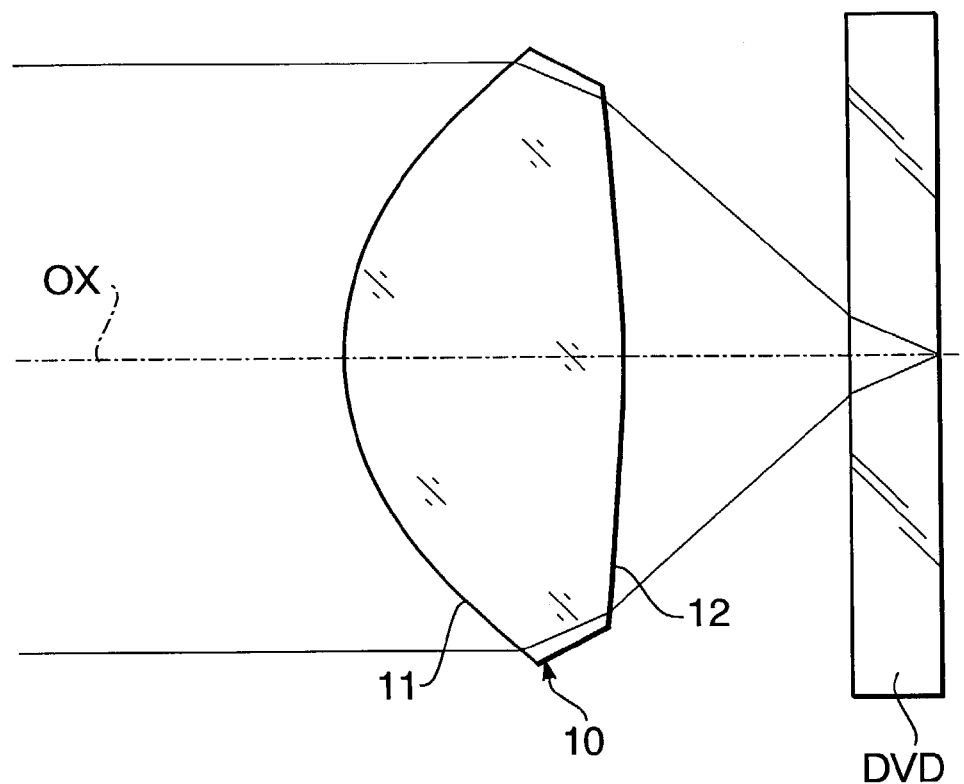

FIG. 3 schematically shows a side view of an objective lens 10 according to a first embodiment and a DVD. A first surface 11 of the les 10 is divided into a central area Rc and a peripheral area Rh. Any point in the central area Rc satisfies $0 \leq h < 1.557$ (mm), h being a distance from the optical axis OX to the point, and any point in the peripheral area Rh satisfies $1.557 \leq h \leq 2.045$ (mm). A base curve (a shape of the surface excluding a diffraction lens structure) of the central area Rc and the base curve of the peripheral area Rh are rotationally symmetrical aspherical surface, which are defined by different coefficients. A diffraction lens structure formed in the central area Rc and that in the peripheral area Rh are defined by different optical path difference functions. A second surface 12 is a rotational symmetrical aspherical surface which is not formed with a diffraction lens structure.

Generally, a shape of the rotationally symmetrical aspherical surface is expressed by the following function:

$$X(h) = \frac{Ch^2}{1 + \sqrt{1-(1+K)C^2h^2}} + A_4h^4 + A_6h^6 + A_8h^8 + A_{10}h^{10} + A_{12}h^{12}$$

where, X(h) represents a SAG amount (a distance between a point on the aspherical surface whose height from the optical axis is h and a plane tangential to the aspherical surface at the optical axis), C represents a curvature (=1/r, r being a radius) of the aspherical surface on the optical axis, K is a conical coefficient, and $A_4$, $A_6$, $A_8$, $A_{10}$ and $A_{12}$ are 4th, 6th, 8th, 10th and 12th aspherical coefficients, respectively.

Additional optical path length by the diffraction lens structure is expressed by an optical path difference function φ(h) as follows.

$$\phi(h) = (P_2h^2 + P_4h^4 + P_6h^6 + \ldots) \times m \times \lambda$$

where, Pn (n being an even number) represents a n-th order optical path difference function coefficient, m represents a diffraction order and λ represents a wavelength. The optical path difference function φ(h) is a representation of a function of the diffraction lens by the additional amount of an optical path at the height h from the optical axis, the value of the optical path difference function being positive when the diffraction lens has a light diverging function.

Actual fine configuration of the diffraction lens structure is determined by deleting components corresponding to integral multiples of the wavelength from the optical path length which is expressed by the above optical path difference function. Specifically, when the first order diffraction component is used, the width of each annular zone is set so that the optical path difference function at the inner radius of the annular zone will be different from that at the outer radius by one wavelength, and the level difference between adjacent annular zones are set so that an optical path difference of a wavelength will be given to the incident light.

A numerical structure of the objective lens 10 according to the first embodiment will be indicated in TABLEs 1 and 2. In TABLE 1, basic structures of the objective lens 10 and the DVD are indicated, and in TABLE 2, coefficients defining the base curve and the diffraction lens structure of the first surface 11, and coefficients defining the aspherical shape of the second surface 12 are indicated. In TABLEs 1 and 2, $NA_1$, $f_1$ and $\lambda_1$ denote the numerical aperture, the focal length (mm) of the objective lens 10 including the diffraction lens structure, and the wavelength (nm) when the DVD is used, and $NA_2$, $f_2$ and $\lambda_2$ denote the numerical aperture, the focal length (nm) of the objective lens 10 including the diffraction lens structure, and the wavelength (nm) when the CD is used. Further, r denotes the paraxial radius of curvature (mm) of each surface, d denotes the interval (mm) between the surfaces, and nλ denotes a refraction index when the wavelength is λ.

TABLE 1

| SURFACE # | r | d | n 660 | n 789 |
|---|---|---|---|---|
| 1 | 1.834 | 1.890 | 1.54044 | 1.53655 |
| 2 | −7.806 | 1.525 | — | — |
| 3 | ∞ | 0.600 | 1.57961 | 1.57311 |
| 4 | ∞ | — | — | — |

$NA_1 = 0.67\ f_1 = 2.97\ \lambda_1 = 660$
$NA_2 = 0.52\ f_2 = 2.99\ \lambda_2 = 789$

TABLE 2

| | FIRST SURFACE | | |
|---|---|---|---|
| COEFFICIENT | CENTRAL AREA | PERIPHERAL AREA | SECOND SURFACE |
| r | 1.834 | 1.856 | −7.806 |
| κ | −0.490 | −0.490 | 0.000 |
| A4 | −3.784 × 10⁻³ | −2.738 × 10⁻³ | 1.912 × 10⁻² |
| A6 | −4.190 × 10⁻⁴ | 3.807 × 10⁻⁴ | −3.745 × 10⁻³ |
| A8 | −9.442 × 10⁻⁵ | −2.833 × 10⁻⁴ | −7.212 × 10⁻⁵ |
| A10 | −2.255 × 10⁻⁶ | 6.163 × 10⁻⁵ | 1.132 × 10⁻⁴ |
| A12 | −1.097 × 10⁻⁵ | −1.841 × 10⁻⁵ | −1.210 × 10⁻⁵ |
| P2 | 1.800 × 10⁻⁰ | −8.408 × 10⁻¹ | — |
| P4 | −2.771 × 10⁻⁰ | −1.991 × 10⁻⁰ | — |
| P6 | −1.725 × 10⁻¹ | 2.285 × 10⁻¹ | — |
| P8 | −4.546 × 10⁻² | −7.800 × 10⁻² | — |
| P10 | 0.000 | 0.000 | — |
| P12 | 0.000 | 0.000 | — |

TABLE 3 shows a fine configuration of the diffraction lens formed on the first surface 11. In TABLE 3, h_min and h_max represent height (mm) from the optical axis of inner (optical axis side) boundary and outer boundary of each annular zone, θh_min and θh_max respectively represent wavefront aberrations at inner and outer boundaries of each annular zone, Δθ represents a difference of the wavefront aberrations θh_max—θh_min for each zone. In the table, the wavefront aberration difference is indicated by a unit of a phase (e.g., 2π).

In the table, the annular zones are indicated such that a circular zone including the optical axis OX of the objective lens is a No. 0 annular zone, and the numbers are given to the outer annular zones sequentially. In the embodiments, there are 27 zones (i.e., Nos. 0 through 26 annular zones). Specifically, the annular zones 0 through 16 are included in the central area Rc, and the annular zones 17 through 26 are included in the peripheral area Rh.

TABLE 3

| ZONE # | h_min | h_max | ZONE WIDTH | WAVEFRONT ABERRATION (789 nm) | | |
|---|---|---|---|---|---|---|
| | | | | θh_min | θh_max | Δθ |
| 0 | 0.000 | 0.905 | 0.905 | 0.000 | −0.118π | −0.118π |
| 1 | 0.905 | 1.033 | 0.128 | 0.090π | −0.090π | −0.180π |
| 2 | 1.033 | 1.116 | 0.083 | 0.090π | −0.090π | −0.180π |
| 3 | 1.116 | 1.180 | 0.064 | 0.090π | −0.090π | −0.180π |
| 4 | 1.180 | 1.232 | 0.052 | 0.090π | −0.090π | −0.180π |
| 5 | 1.232 | 1.277 | 0.045 | 0.090π | −0.090π | −0.180π |
| 6 | 1.277 | 1.316 | 0.039 | 0.090π | −0.090π | −0.180π |
| 7 | 1.316 | 1.351 | 0.035 | 0.090π | −0.090π | −0.180π |
| 8 | 1.351 | 1.383 | 0.032 | 0.090π | −0.090π | −0.180π |
| 9 | 1.383 | 1.412 | 0.029 | 0.090π | −0.090π | −0.180π |
| 10 | 1.412 | 1.438 | 0.026 | 0.090π | −0.090π | −0.180π |
| 11 | 1.438 | 1.463 | 0.025 | 0.090π | −0.090π | −0.180π |
| 12 | 1.463 | 1.487 | 0.024 | 0.089π | −0.089π | −0.178π |
| 13 | 1.487 | 1.508 | 0.021 | 0.089π | −0.089π | −0.178π |
| 14 | 1.508 | 1.529 | 0.021 | 0.089π | −0.089π | −0.178π |
| 15 | 1.529 | 1.549 | 0.021 | 0.089π | −0.089π | −0.178π |
| 16 | 1.549 | 1.557 | 0.008 | 0.040π | −0.040π | −0.080π |

TABLE 3-continued

| ZONE | | | | ZONE | WAVEFRONT ABERRATION (789 nm) | |
|---|---|---|---|---|---|---|
| # | h_min | h_max | WIDTH | θh_min | θh_max | Δθ |
| 17 | 1.557 | 1.700 | 0.143 | 0.333π | −2.823π | −3.156π |
| 18 | 1.700 | 1.776 | 0.076 | −1.486π | −3.648π | −2.162π |
| 19 | 1.776 | 1.839 | 0.063 | −2.311π | −4.445π | −2.134π |
| 20 | 1.839 | 1.861 | 0.021 | −3.442π | −4.233π | −0.791π |
| 21 | 1.861 | 1.874 | 0.014 | −3.898π | −4.423π | −0.524π |
| 22 | 1.874 | 1.894 | 0.020 | −4.088π | −4.870π | −0.782π |
| 23 | 1.894 | 1.942 | 0.048 | −3.867π | −5.923π | −2.056π |
| 24 | 1.942 | 1.985 | 0.043 | −4.585π | −6.600π | −2.015π |
| 25 | 1.985 | 2.023 | 0.038 | −5.260π | −7.234π | −1.974π |
| 26 | 2.023 | 2.045 | 0.022 | −5.892π | −7.106π | −1.214π |

The annular zone 21 is designed such that, when the wavelength is 660 nm (for DVD), the optical path difference at the boundary with respect to the adjoining annular zones is one wavelength.

Figure 4:
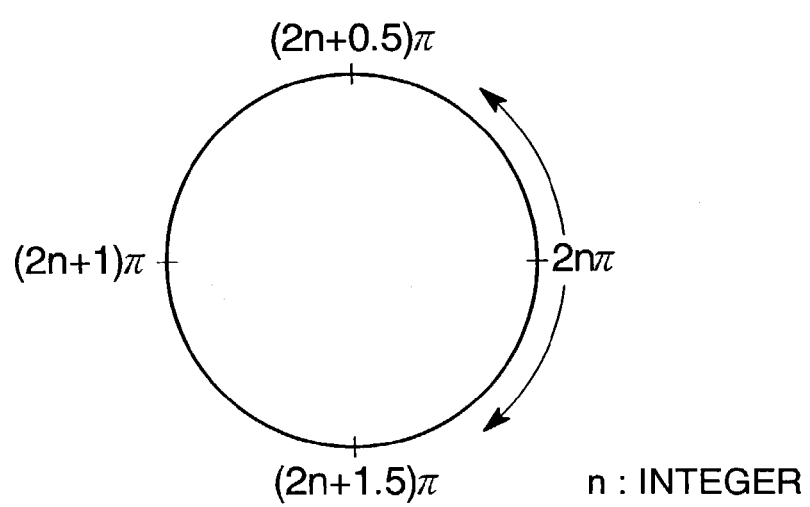

Next, for each annular zone formed on the objective lens 10 according to the first embodiment, the wavefront aberration when the wavelength corresponding to the CD is used will be described. In the following description, the wavefront aberration will be represented using a circular graph (see FIG. 4). As shown in FIG. 4, a right-hand side of the circle (a three o'clock direction) represents a phase 2nπ (n being natural number). A clockwise direction is defined as a negative direction and a counterclockwise direction is defined as a positive direction, and the phase changes by 0.5π at every 90°. Since the difference of the phase by 2π is regarded as no difference, a full circle represents 2π.

As indicated in TABLE 3, the annular zones formed in the central area Rc are designed such that a change of wavefront aberration in each zone between an optical axis side and a peripheral side thereof is approximately within a range of 0.1π through 0.2π. Further, the quantity of the wavefront aberration in each of the annular zones in the central area Rc distributes from a certain positive value to a negative value having the same absolute value of the positive value. The directions of the wavefront aberrations of the annular zones in the central area Rc are aligned to be 2nπ.

On the contrary, in each of the annular zones formed in the peripheral area Rh, the wavefront aberration changes greatly. Further, the changing ranges of the wavefront aberration in the annular zones are different from each other. If the changing range of the wavefront aberration is less than π in the annular zone, a directionality of the wavefront aberration appears clearly. On the contrary, if the changing range of the wavefront aberration is close to 2π in the annular zone, the directionality of the wavefront aberration does not appear. FIGS. 5A through 5E are circular graph representations of the changes of wavefront aberrations in some annular zones formed in the peripheral area Rh of the objective lens 10. Since the difference of the wavelength aberrations of each of the annular zones Nos. 18, 19 and 23-25 is close to 2π, the circle graphs thereof are omitted.

Figure 5A:
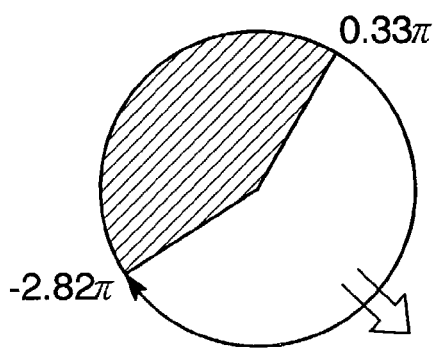
FIGS. 5A-5E are circle graphs showing changes of the wavefront aberration when a beam having a wavelength of 789 nm is incident on the objective lens according to the first embodiment.
Figure 5B:
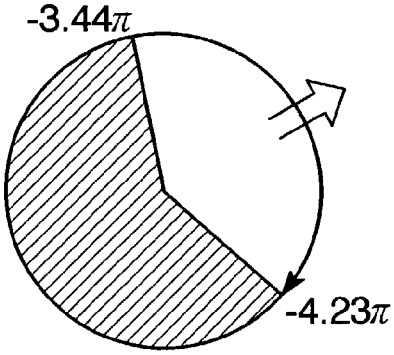
Figure 5C:
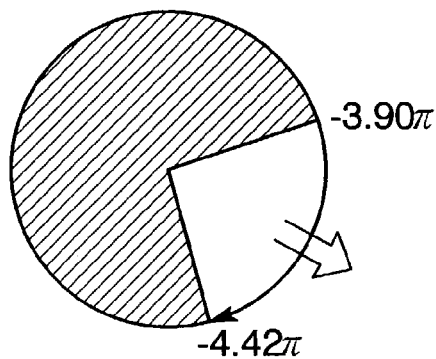
Figure 5D:
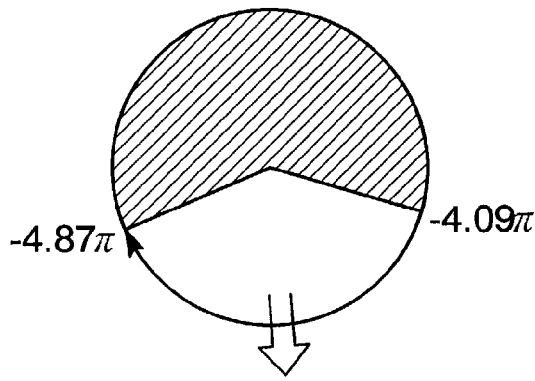
Figure 5E:
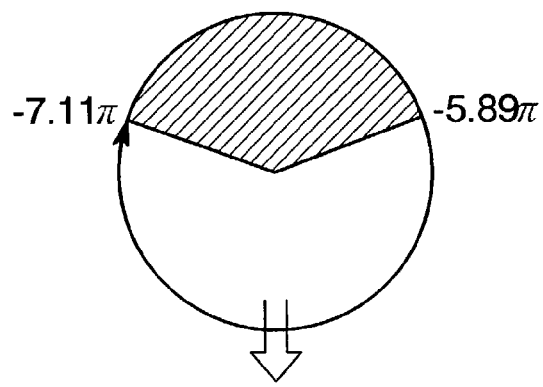

As shown TABLE 3, the No. 17 annular zone is configured such that the wavefront aberration at the optical axis side boundary is 0.333π and that at the peripheral side boundary is −2.823π. This condition is indicated in FIG. 5A. As indicated by an arrow, the wavefront aberration has the directionality oriented to a lower right direction in FIG. 5A.

Incidentally, as aforementioned, the wavefront aberration of the light flux passed through each annular zone formed in the central area Rc is directed in the right-hand side direction of the circular graph shown in FIG. 4. Therefore, if the arrow is directed to the right-hand side in the graphs shown in FIGS. 5A through 5E, the light flux passed through the annular zone has substantially the same phase as the light flux passed through the annular zones in the central area Rc.

As shown in FIG. 5A, the phase of the light flux corresponding to the CD (i.e., 789 nm) and passed through the annular zone No. 17 is different from the phase of the light flux passed through the central area Rc. The annular zone No. 17 will be referred to as a first annular region.

Similarly, the wavefront aberrations provided by the annular zones Nos. 20, 21, 22 and 26 are indicated in FIGS. 5B, 5C, 5D and 5E. It is known that the phases provided by the annular zones Nos. 20 and 21 are substantially the same as those provided by the annular zones in the central area Rc. That is, the annular zones Nos. 20 and 21 are designed such that the phase of the light flux corresponding to the CD (i.e., 789 nm) passed through the annular zone No. 20 or 21 is substantially the same as the phase of the light flux passed through the central area Rc. These annular zones (i.e., the annular zones Nos. 20 and 21) will be referred to as the second annular region.

A ratio $h_S/h_B$ equals to 1.18, which satisfies condition (1) described above.

Embodiment 2

An objective lens according to a second embodiment is a single element plastic lens, similar to the lens shown in FIG. 3, having aspherical surfaces on both sides. One lens surface is divided into the central area Rc and the peripheral area Rh, and the diffraction lens structure is formed in both areas. The base curve of the first surface (11), the optical path difference function coefficients defining the diffraction lens structure, the shape of the second surface (12) are similar to those of the embodiment 1, and thus the same as indicated in TABLES 1 and 2. The fine configuration of the diffraction lens structure formed in the peripheral area Rh in the second embodiment is different from that in the first embodiment.

TABLE 4 shows a fine configuration of the diffraction lens structure formed on the first surface 11 of the objective lens according to the second embodiment.

In the table, the annular zones are indicated such that a circular zone including the optical axis OX of the objective lens is a No. 0 annular zone, and the numbers are given to the outer annular zones sequentially. In the embodiments, there are 29 zones (i.e., Nos. 0 through 28 annular zones). Specifically, the annular zones 0 through 16 are included in the central area Rc, and the annular zones 17 through 28 are included in the peripheral area Rh.

TABLE 4

| ZONE | | | | ZONE | WAVEFRONT ABERRATION (789 nm) | |
|---|---|---|---|---|---|---|
| # | h_min | h_max | WIDTH | θh_min | θh_max | Δθ |
| 0 | 0.000 | 0.905 | 0.905 | 0.000 | −0.118π | −0.118π |
| 1 | 0.905 | 1.033 | 0.128 | 0.090π | −0.090π | −0.180π |
| 2 | 1.033 | 1.116 | 0.083 | 0.090π | −0.090π | −0.180π |
| 3 | 1.116 | 1.180 | 0.064 | 0.090π | −0.090π | −0.180π |
| 4 | 1.180 | 1.232 | 0.052 | 0.090π | −0.090π | −0.180π |
| 5 | 1.232 | 1.277 | 0.045 | 0.090π | −0.090π | −0.180π |
| 6 | 1.277 | 1.316 | 0.039 | 0.090π | −0.090π | −0.180π |
| 7 | 1.316 | 1.351 | 0.035 | 0.090π | −0.090π | −0.180π |
| 8 | 1.351 | 1.383 | 0.032 | 0.090π | −0.090π | −0.180π |
| 9 | 1.383 | 1.412 | 0.029 | 0.090π | −0.090π | −0.180π |
| 10 | 1.412 | 1.438 | 0.026 | 0.090π | −0.090π | −0.180π |

TABLE 4-continued

| ZONE # | ZONE | | | WAVEFRONT ABERRATION (789 nm) | | |
|---|---|---|---|---|---|---|
| | h_min | h_max | WIDTH | θh_min | θh_max | Δθ |
| 11 | 1.438 | 1.463 | 0.025 | 0.090π | −0.090π | −0.180π |
| 12 | 1.463 | 1.487 | 0.024 | 0.089π | −0.089π | −0.178π |
| 13 | 1.487 | 1.508 | 0.021 | 0.089π | −0.089π | −0.178π |
| 14 | 1.508 | 1.529 | 0.021 | 0.089π | −0.089π | −0.178π |
| 15 | 1.529 | 1.549 | 0.021 | 0.089π | −0.089π | −0.178π |
| 16 | 1.549 | 1.557 | 0.008 | 0.040π | −0.040π | −0.080π |
| 17 | 1.557 | 1.700 | 0.143 | 0.333π | −2.823π | −3.156π |
| 18 | 1.700 | 1.776 | 0.076 | −1.486π | −2.519π | −2.162π |
| 19 | 1.776 | 1.839 | 0.063 | −2.311π | −4.445π | −2.134π |
| 20 | 1.839 | 1.847 | 0.008 | −3.776π | −4.040π | −0.264π |
| 21 | 1.847 | 1.861 | 0.013 | −3.706π | −4.233π | −0.527π |
| 22 | 1.861 | 1.874 | 0.013 | −3.898π | −4.423π | −0.524π |
| 23 | 1.874 | 1.888 | 0.014 | −4.088π | −4.610π | −0.522π |
| 24 | 1.888 | 1.894 | 0.006 | −4.276π | −4.536π | −0.260π |
| 25 | 1.894 | 1.942 | 0.048 | −3.867π | −5.923π | −2.056π |
| 26 | 1.942 | 1.985 | 0.043 | −4.585π | −6.600π | −2.015π |
| 27 | 1.985 | 2.023 | 0.038 | −5.260π | −7.234π | −1.974π |
| 28 | 2.023 | 2.045 | 0.022 | −5.892π | −7.106π | −1.214π |

Each of the annular zones 21 through 23 is designed such that, when the wavelength is 660 nm (for DVD), the optical path difference at the boundary with respect to the adjoining annular zones is one wavelength.

Next, for each annular zone formed on the objective lens 10 according to the second embodiment, the wavefront aberration when the wavelength corresponding to the CD is used will be described. Each annular zone formed in the central area Rc is the same as that of the first embodiment, and the direction of the wavefront aberration of each annular zone is 2π.

On the contrary, in each of the annular zones formed in the peripheral area Rh, the wavefront aberration changes greatly. Further, the changing ranges of the wavefront aberration in the annular zones of the peripheral area Rh are different from each other.

FIGS. 6A through 6G are circular graph representations of the changes of wavefront aberrations in some annular zones formed in the peripheral area Rh of the objective lens 10. Since the difference of the wavelength aberrations of each of the annular zones Nos. 18, 19 and 25-27 is close to 2π, the circle graphs thereof are omitted.

Figure 6A:
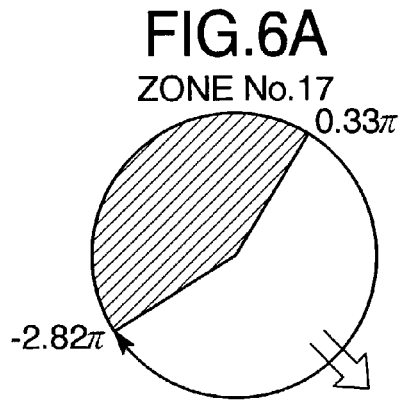
FIGS. 6A-6G are circle graphs showing changes of the wavefront aberration when a beam having a wavelength of 789 nm is incident on the objective lens according to a second embodiment.
Figure 6B:
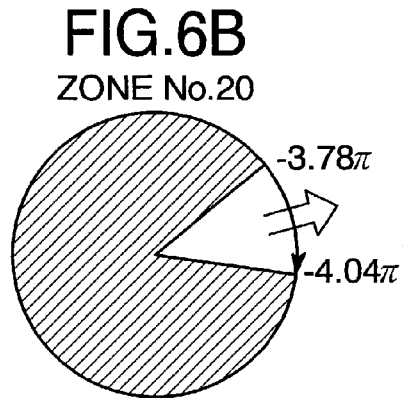
Figure 6C:
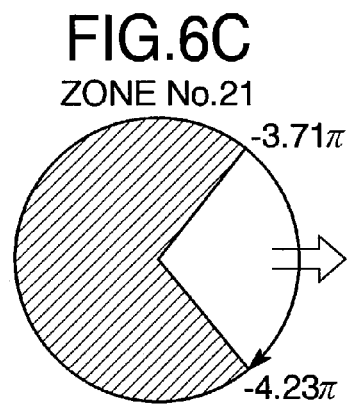
Figure 6D:
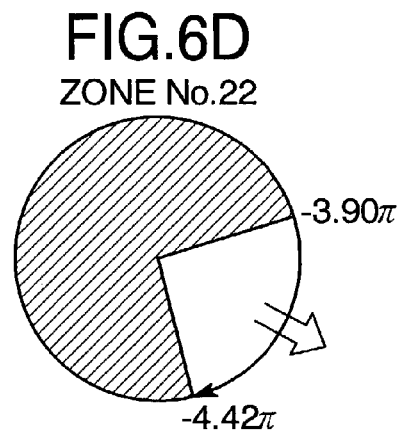
Figure 6E:
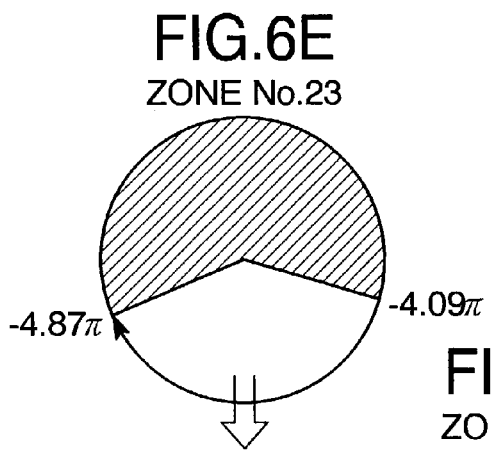
Figure 6F:
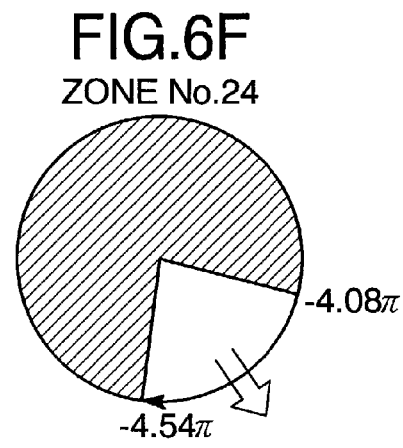
Figure 6G:
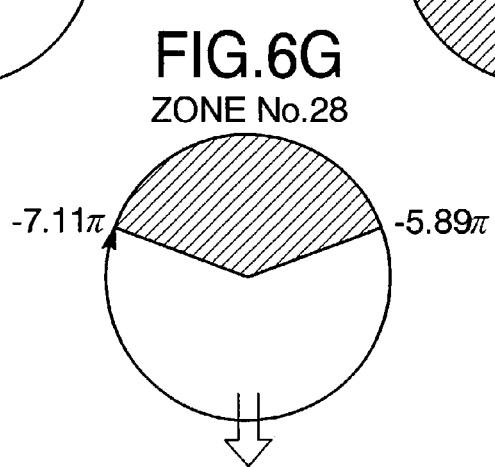

As indicated by an arrow, the wavefront aberration provided by the annular zone No. 17 has the directionality oriented to a lower right direction in FIG. 6A. The phase of the light flux corresponding to the CD (i.e., 789 nm) and passed through the annular zone No. 17 is different from the phase of the light flux passed through the central area Rc. The annular zone No. 17 will be referred to as a first annular region.

Similarly, the wavefront aberrations provided by the annular zones Nos. 20 through 24 and 28 are indicated in FIGS. 6B through 6G. It is known from the drawings that the phases provided by the annular zones Nos. 20, 21 and 22 are substantially the same as those provided by the annular zones in the central area Rc. That is, the annular zones Nos. 20, 21 and 22 are designed such that the phase of the light flux corresponding to the CD (i.e., 789 nm) passed through the annular zone No. 20, 21 or 22 is substantially the same as the phase of the light flux passed through the central area Rc. These annular zones (i.e., the annular zones Nos. 20, 21 and 22) will be referred to as the second annular region.

A ratio $h_S/h_B$ equals to 1.18 if the boundary $h_S$ between the first annular region and the second annular region, and the boundary $h_B$ between the central area Rc and the peripheral area Rh are used, which satisfies condition (1) described above.

Light intensity distribution on the recoding surface of the CD when the objective lens according to the first or second embodiment, which has the same basic design will be described in comparison with that of a first comparative example which is not provided with the second annular region.

Figure 7:
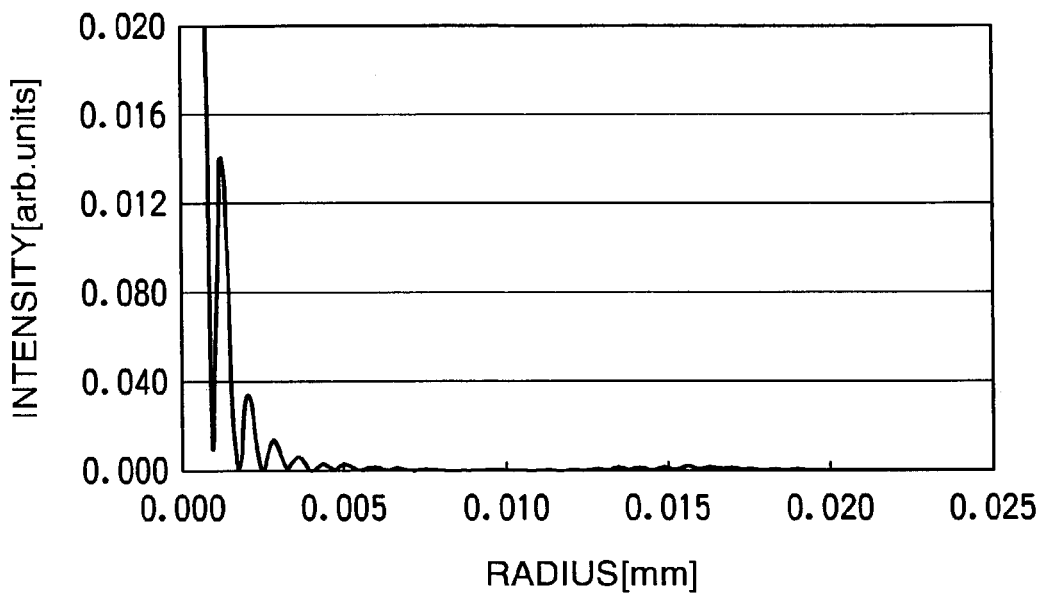
FIG. 7 shows light intensity distribution on a recording surface of a CD when an objective lens according to a first comparative example is used.

FIG. 7 is a graph showing the light intensity distribution on the recording surface of the CD when the objective lens according to the first comparative example is used. The vertical axis represents the intensity, and the horizontal axis represents a radius (unit: mm) with respect to the optical axis. The first comparative example has the same basic design as that of the first and second embodiments. However, as described above, the first comparative example does not have the second annular region in the peripheral area Rh, and all the annular zones in the peripheral area Rh are designed such that the wavefront aberration changing range is greater than π for the light flux having the wavelength of 789 nm.

Figure 8:
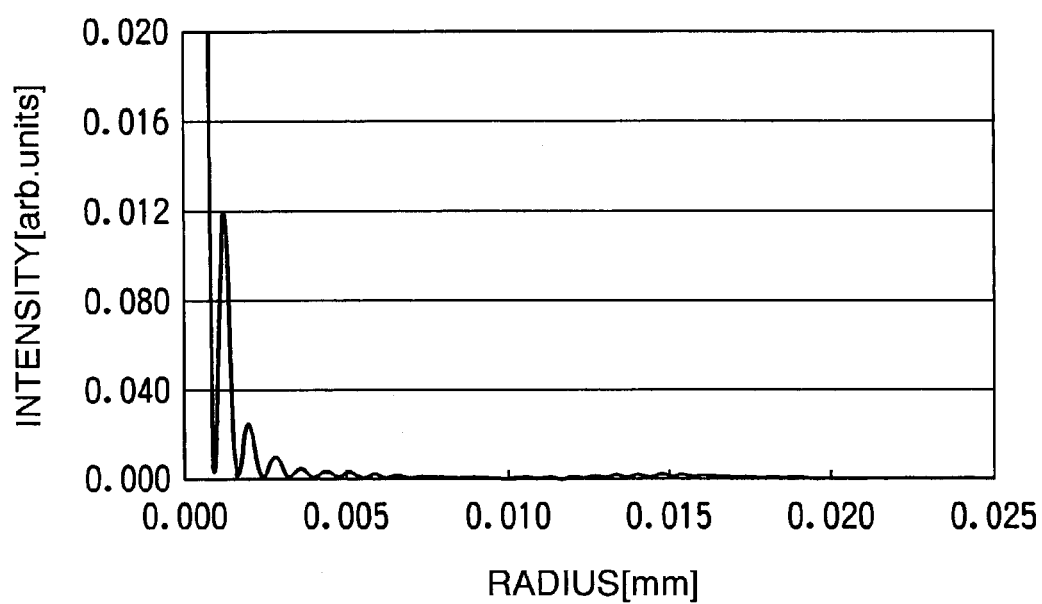
FIG. 8 shows light intensity distribution on a recording surface of a CD when an objective lens according to the first embodiment is used.
Figure 9:
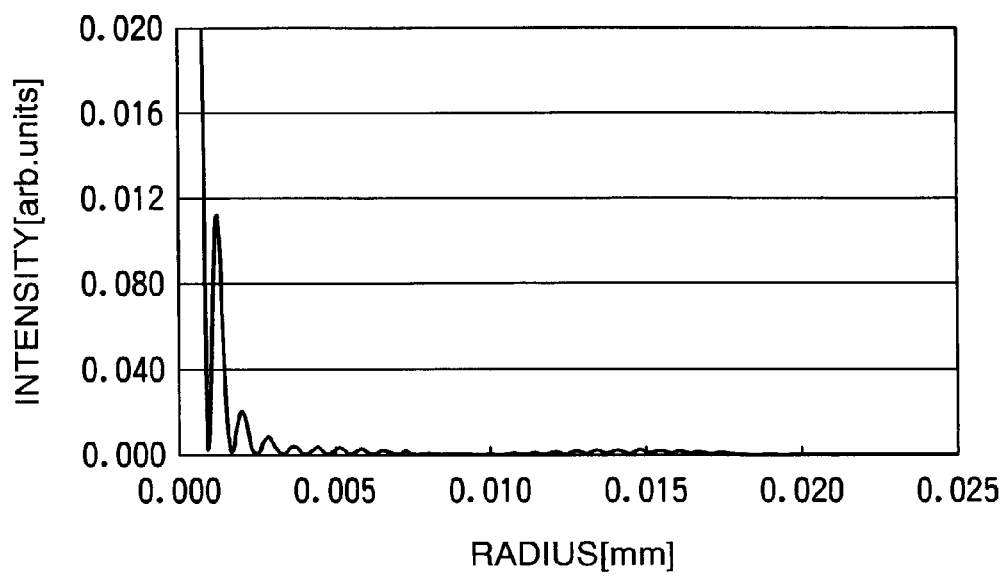
FIG. 9 shows light intensity distribution on a recording surface of a CD when an objective lens according to the second embodiment is used.

FIGS. 8 and 9 are graphs showing light intensity distributions on the recording surface of the CD when the objective lenses according to the first and second embodiments are used, respectively. Since the beam spot (i.e., main beam) has an significantly large intensity, the peak thereof is not shown in each graph. It should be noted that a main beam radius is defined as a portion from the center to a first dark ring (which is a position where the intensity firstly becomes substantially zero when a distance from the center increases).

The main beam radius of the first or second embodiment is 1.1% smaller than that of the first comparative example, which does not show any significance. However, regarding the intensity of a first side lobe, the change is −16.8% in the first embodiment, and −22.5% in the second embodiment. The number of the annular zones included in the second region is two in the first embodiment, and three in the second embodiment. Therefore, it is understood that the effect of suppressing the side lobe is greater as the number of the annular zones included in the second region increases.

Embodiment 3

FIG. 10 schematically shows a side view of an objective lens 10 according to a third embodiment and a DVD. A first surface 11 of the les 10 is divided into a central area Rc and a peripheral area Rh. Any point in the central area Rc satisfies 0≦h<1.567 (mm), h being a distance from the optical axis OX to the point, and any point in the peripheral area Rh satisfies 1.567≦h≦2.086 (mm). A base curve of the central area Rc and the base curve of the peripheral area Rh are rotationally symmetrical aspherical surface, which are defined by different coefficients. A diffraction lens structure formed in the central area Rc and that in the peripheral area Rh are defined by different optical path difference functions. A second surface 12 is a rotational symmetrical aspherical surface which is not formed with a diffraction lens structure.

A numerical structure of the objective lens 10 according to the third embodiment will be indicated in TABLEs 5 and 6. Further, TABLE 7 shows a fine configuration of the diffraction lens formed on the first surface 11. In the table, the annular zones are indicated such that a circular zone including the optical axis OX of the objective lens is a No. 0 annular zone, and the numbers are given to the outer annular zones sequentially. In the embodiments, there are 18 zones (i.e., Nos. 0 through 17 annular zones). Specifically, the annular zones 0 through 11 are included in the central area Rc, and the annular zones 12 through 17 are included in the peripheral area Rh.

TABLE 5

| SURFACE # | r | d | n 657 | n 790 |
|---|---|---|---|---|
| 1 | 2.109 | 2.210 | 1.54056 | 1.53635 |
| 2 | −8.228 | 1.746 | — | — |
| 3 | ∞ | 0.600 | 1.57982 | 1.57307 |
| 4 | ∞ | — | — | — |

$NA_1 = 0.60$  $f_1 = 3.36$  $\lambda_1 = 657$
$NA_2 = 0.46$  $f_2 = 3.39$  $\lambda_2 = 790$

TABLE 6

| | FIRST SURFACE | | |
|---|---|---|---|
| COEFFICIENT | CENTRAL AREA | PERIPHERAL AREA | SECOND SURFACE |
| r | 2.109 | 2.115 | −8.228 |
| κ | −0.500 | −0.500 | 0.000 |
| A4 | −2.026 × 10⁻³ | −2.174 × 10⁻³ | 1.509 × 10⁻² |
| A6 | −2.257 × 10⁻⁴ | 1.212 × 10⁻⁴ | −3.097 × 10⁻³ |
| A8 | −5.327 × 10⁻⁵ | −1.234 × 10⁻⁴ | 1.920 × 10⁻⁴ |
| A10 | 7.281 × 10⁻⁶ | 3.132 × 10⁻⁵ | 0.000 |
| A12 | −3.848 × 10⁶ | −6.292 × 10⁻⁶ | 0.000 |
| P2 | 2.000 × 10⁻¹ | −3.537 × 10⁻¹ | — |
| P4 | −1.637 × 10⁻⁰ | −1.734 × 10⁻⁰ | — |
| P6 | −1.443 × 10⁻¹ | 4.702 × 10⁻² | — |
| P8 | 0.000 | 0.000 | — |
| P10 | 0.000 | 0.000 | — |
| P12 | 0.000 | 0.000 | — |

TABLE 7

| ZONE # | ZONE | | | WAVEFRONT ABERRATION (790 nm) | | |
|---|---|---|---|---|---|---|
| | h_min | h_max | WIDTH | θh_min | θh_max | Δθ |
| 0 | 0.000 | 0.774 | 0.774 | 0.000 | −0.143π | −0.143π |
| 1 | 0.774 | 0.988 | 0.214 | 0.107π | −0.103π | −0.210π |
| 2 | 0.988 | 1.109 | 0.121 | 0.100π | −0.099π | −0.200π |
| 3 | 1.109 | 1.197 | 0.088 | 0.098π | −0.098π | −0.196π |
| 4 | 1.197 | 1.267 | 0.070 | 0.097π | −0.097π | −0.194π |
| 5 | 1.267 | 1.326 | 0.059 | 0.096π | −0.096π | −0.192π |
| 6 | 1.326 | 1.378 | 0.052 | 0.096π | −0.096π | −0.192π |
| 7 | 1.378 | 1.423 | 0.045 | 0.096π | −0.096π | −0.192π |
| 8 | 1.423 | 1.464 | 0.041 | 0.095π | −0.095π | −0.190π |
| 9 | 1.464 | 1.501 | 0.037 | 0.095π | −0.095π | −0.190π |
| 10 | 1.501 | 1.535 | 0.034 | 0.095π | −0.095π | −0.190π |
| 11 | 1.535 | 1.567 | 0.032 | 0.095π | −0.095π | −0.190π |
| 12 | 1.567 | 1.688 | 0.121 | 0.319π | −1.267π | −1.586π |
| 13 | 1.688 | 1.807 | 0.119 | 0.121π | −1.908π | −2.029π |
| 14 | 1.807 | 1.896 | 0.089 | −0.521π | −2.424π | −1.903π |
| 15 | 1.896 | 1.920 | 0.024 | −1.730π | −2.294π | −0.564π |
| 16 | 1.920 | 1.997 | 0.077 | −1.600π | −3.646π | −2.045π |
| 17 | 1.997 | 2.086 | 0.089 | −2.255π | −5.039π | −2.784π |

The annular zone 15 is designed such that, when the wavelength is 657 nm (for DVD), the optical path difference at the boundary with respect to the adjoining annular zones is one wavelength.

Next, for each annular zone formed on the objective lens 10 according to the third embodiment, the wavefront aberration when the wavelength corresponding to the CD is used will be described using circular graphs. As shown in Table 7, the annular zones formed in the central area Rc are designed such that a change of wavefront aberration in each zone between an optical axis side and a peripheral side thereof is approximately within a range of 0.1π through 0.2π. Further, the quantity of the wavefront aberration in each of the annular zones in the central area Rc distributes from a certain positive value to a negative value having the same absolute value of the positive value. The directions of the wavefront aberrations of the annular zones in the central area Rc are aligned to be 2nπ.

On the contrary, in each of the annular zones formed in the peripheral area Rh, the wavefront aberration changes greatly. Further, the changing ranges of the wavefront aberration in the annular zones of the peripheral area Rh are different from each other.

FIGS. 11A through 11C are circular graph representations of the changes of wavefront aberrations in Nos. 12, 15 and 17 annular zones formed in the peripheral area Rh of the objective lens 10. Since the difference of the wavelength aberrations of each of the annular zones Nos. 13, 14 and 16 is close to 2π, the circle graphs thereof are omitted.

As indicated by an arrow, the wavefront aberration provided by the annular zone No. 12 has the directionality oriented to a downward direction in FIG. 11A. It should be noted that, if the arrow is directed to the right-hand direction, the phase of the light flux is substantially the same as the direction of the phase of the light flux passed through the central area Rc. As shown in FIG. 11A, the light flux corresponding to the CD (i.e., 790 nm) and passed through the annular zone No. 12 is different from the phase of the light flux passed through the central area Rc. The annular zone No. 12 will be referred to as a first annular region.

Similarly, the wavefront aberrations provided by the annular zones Nos. 15 and 17 are indicated in FIGS. 11B and 11C. It is known from FIG. 11B that the phase provided by the annular zone No. 15 is substantially the same as that provided by the annular zones in the central area Rc. That is, the annular zone No. 15 are designed such that the phase of the light flux corresponding to the CD (i.e., 789 nm) passed through the annular zone No. 15 is substantially the same as the phase of the light flux passed through the central area Rc. The annular zone No. 15 will be referred to as the second annular region.

A ratio $h_S/h_B$ equals to 1.21 if the boundary $h_S$ between the first annular region and the second annular region, and the boundary $h_B$ between the central area Rc and the peripheral area Rh are used, which satisfies condition (1) described above.

Embodiment 4

An objective lens according to a fourth embodiment is a single element plastic lens, similar to the lens shown in FIG. 10, having aspherical surfaces on both sides. One lens surface is divided into the central area Rc and the peripheral area Rh, and the diffraction lens structure is formed in both areas. The base curve of the first surface (11), the optical path difference function coefficients defining the diffraction lens structure, the shape of the second surface (12) are similar to those of the embodiment 3, and thus the same as indicated in TABLEs 5 and 6. The fine configuration of the diffraction lens structure formed in the peripheral area Rh in the fourth embodiment is different from that in the third embodiment.

TABLE 8 shows a fine configuration of the diffraction lens structure formed on the first surface 11 of the objective lens according to the fourth embodiment.

In the table, the annular zones are indicated such that a circular zone including the optical axis OX of the objective lens is a No. 0 annular zone, and the numbers are given to the outer annular zones sequentially. In the fourth embodiment, there are 17 zones (i.e., Nos. 0 through 16 annular zones). Specifically, the annular zones 0 through 11 are included in the central area Rc, and the annular zones 12 through 16 are included in the peripheral area Rh.

TABLE 8

| ZONE | | | ZONE | WAVEFRONT ABERRATION (790 nm) | | |
|---|---|---|---|---|---|---|
| # | h_min | h_max | WIDTH | θh_min | θh_max | Δθ |
| 0 | 0.000 | 0.774 | 0.774 | 0.000 | −0.143π | −0.143π |
| 1 | 0.774 | 0.988 | 0.214 | 0.107π | −0.103π | −0.210π |
| 2 | 0.988 | 1.109 | 0.121 | 0.100π | −0.099π | −0.200π |
| 3 | 1.109 | 1.197 | 0.088 | 0.098π | −0.098π | −0.196π |
| 4 | 1.197 | 1.267 | 0.070 | 0.097π | −0.097π | −0.194π |
| 5 | 1.267 | 1.326 | 0.059 | 0.096π | −0.096π | −0.192π |
| 6 | 1.326 | 1.378 | 0.052 | 0.096π | −0.096π | −0.192π |
| 7 | 1.378 | 1.423 | 0.045 | 0.096π | −0.096π | −0.192π |
| 8 | 1.423 | 1.464 | 0.041 | 0.095π | −0.095π | −0.190π |
| 9 | 1.464 | 1.501 | 0.037 | 0.095π | −0.095π | −0.190π |
| 10 | 1.501 | 1.535 | 0.034 | 0.095π | −0.095π | −0.190π |
| 11 | 1.535 | 1.567 | 0.032 | 0.095π | −0.095π | −0.190π |
| 12 | 1.567 | 1.688 | 0.121 | 0.319π | −1.267π | −1.586π |
| 13 | 1.688 | 1.807 | 0.119 | 0.121π | −1.908π | −2.029π |
| 14 | 1.807 | 1.908 | 0.101 | −0.521π | −2.705π | −2.184π |
| 15 | 1.908 | 2.007 | 0.099 | −1.664π | −4.294π | −2.630π |
| 16 | 2.007 | 2.086 | 0.079 | −2.556π | −5.039π | −2.483π |

The annular zone 15 is designed such that, when the length is 790 nm (for CD), the change of the wavefront ration is greater than 2π.

Next, for each annular zone formed on the objective lens 10 according to the fourth embodiment, the wavefront aberration when the wavelength corresponding to the CD is used will be described. Each annular zone formed in the central area RC the same as that of the third embodiment, and the direction of the wavefront aberration of each annular zone is 2nπ.

On the contrary, in each of the annular zones formed he peripheral area Rh, the wavefront aberration changes greatly. Further, the changing ranges of the wavefront aberration in the annular zones of the peripheral area Rh are different from each other.

FIGS. 12A through 12C are circular graph representations of the changes of wavefront aberrations in some annular zones formed in the peripheral area Rh of the objective lens 10. Since the difference of the wavelength aberrations of each of the annular zones Nos. 13 and 14 is close to 2π, the circle graphs thereof are omitted.

As indicated by an arrow, the wavefront aberration provided by the annular zone No. 12 has the directionality oriented to a downward direction in FIG. 12A. The phase of the light flux corresponding to the CD (i.e., 790 nm) and passed through the annular zone No. 12 is different from the phase of the light flux passed through the central area Rc. The annular zone No. 12 will be referred to as a first annular region.

Similarly, the wavefront aberrations provided by the annular zones Nos. 15 and 16 are indicated in FIGS. 12B and 12C. It is known from the drawings that the phase provided by the annular zone No. 15 is substantially the same as that provided by the annular zones in the central area Rc. That is, the annular zone No. 15 is designed such that the phase of the light flux corresponding to the CD (i.e., 790 nm) passed through the annular zone No. 15 is substantially the same as the phase of the light flux passed through the central area Rc. The annular zone No. 15 will be referred to as the second annular region.

A ratio $h_S/h_B$ equals to 1.23 if the boundary $h_S$ between the first annular region and the second annular region, and the boundary $h_B$ between the central area Rc and the peripheral area Rh are used, which satisfies condition (1) described above.

Embodiment 5

An objective lens according to a fifth embodiment is a single element plastic lens, similar to the lens shown in FIG. 10, having aspherical surfaces on both sides. One lens surface is divided into the central area Rc and the peripheral area Rh, and the diffraction lens structure is formed in both areas. The base curve of the first surface (11), the optical path difference function coefficients defining the diffraction lens structure, the shape of the second surface (12) are similar to those of the embodiment 3, and thus the same as indicated in TABLES 5 and 6. The fine configuration of the diffraction lens structure formed in the peripheral area Rh in the fifth embodiment is different from that in the third embodiment.

TABLE 9 shows a fine configuration of the diffraction lens structure formed on the first surface 11 of the objective lens according to the second embodiment.

In the table, the annular zones are indicated such that a circular zone including the optical axis OX of the objective lens is a No. 0 annular zone, and the numbers are given to the outer annular zones sequentially. In the embodiments, there are 18 zones (i.e., Nos. 0 through 17 annular zones). Specifically, the annular zones 0 through 11 are included in the central area Rc, and the annular zones 12 through 17 are included in the peripheral area Rh.

TABLE 9

| ZONE | | | ZONE | WAVEFRONT ABERRATION (790 nm) | | |
|---|---|---|---|---|---|---|
| # | h_min | h_max | WIDTH | θh_min | θh_max | Δθ |
| 0 | 0.000 | 0.774 | 0.774 | 0.000 | −0.143π | −0.143π |
| 1 | 0.774 | 0.988 | 0.214 | 0.107π | −0.103π | −0.210π |
| 2 | 0.988 | 1.109 | 0.121 | 0.100π | −0.099π | −0.200π |
| 3 | 1.109 | 1.197 | 0.088 | 0.098π | −0.098π | −0.196π |
| 4 | 1.197 | 1.267 | 0.070 | 0.097π | −0.097π | −0.194π |
| 5 | 1.267 | 1.326 | 0.059 | 0.096π | −0.096π | −0.192π |
| 6 | 1.326 | 1.378 | 0.052 | 0.096π | −0.096π | −0.192π |
| 7 | 1.378 | 1.423 | 0.045 | 0.096π | −0.096π | −0.192π |
| 8 | 1.423 | 1.464 | 0.041 | 0.095π | −0.095π | −0.190π |
| 9 | 1.464 | 1.501 | 0.037 | 0.095π | −0.095π | −0.190π |
| 10 | 1.501 | 1.535 | 0.034 | 0.095π | −0.095π | −0.190π |
| 11 | 1.535 | 1.567 | 0.032 | 0.095π | −0.095π | −0.190π |
| 12 | 1.567 | 1.688 | 0.121 | −0.281π | −1.867π | −1.586π |
| 13 | 1.688 | 1.807 | 0.119 | 0.121π | −1.908π | −2.029π |
| 14 | 1.807 | 1.896 | 0.089 | −0.521π | −2.424π | −1.903π |
| 15 | 1.896 | 1.920 | 0.024 | −1.730π | −2.294π | −0.564π |
| 16 | 1.920 | 1.997 | 0.077 | −1.600π | −3.646π | −2.045π |
| 17 | 1.997 | 2.086 | 0.089 | −2.255π | −5.039π | −2.784π |

The annular zone 15 is designed such that, when the wavelength is 660 nm (for DVD), the optical path difference at boundaries with respect to the adjoining annular zones is one wavelength.

Next, for each annular zone formed on the objective lens 10 according to the fifth embodiment, the wavefront aberration when the wavelength corresponding to the CD is used will be described. Each annular zone formed in the central area Rc is the same as that of the third embodiment, and the direction of the wavefront aberration of each annular zone is 2nπ.

On the contrary, in each of the annular zones formed in the peripheral area Rh, the wavefront aberration changes greatly. Further, the changing ranges of the wavefront aberration in the annular zones of the peripheral area Rh are different from each other.

FIGS. 13A through 13C are circular graph representations of the changes of wavefront aberrations in some annular zones formed in the peripheral area Rh of the objective lens 10. Since the difference of the wavelength aberrations of each of the annular zones Nos. 13, 14 and 16 is close to 2π, the circle graphs thereof are omitted.

As indicated by an arrow, the wavefront aberration provided by the annular zone No. 12 has the directionality oriented to a left-hand direction in FIG. 13A. The phase of the light flux corresponding to the CD (i.e., 790 nm) and passed through the annular zone No. 12 is different from (i.e., opposite to) the phase of the light flux passed through the central area Rc (i.e., reversed phase). The annular zone No. 12 will be referred to as a first annular region.

Similarly, the wavefront aberrations provided by the annular zones Nos. 15 and 17 are indicated in FIGS. 13B and 13C. It is known from the drawings that the phase provided by the annular zone No. 15 is substantially the same as that provided by the annular zones in the central area Rc. That is, the annular zone No. 15 is designed such that the phase of the light flux corresponding to the CD (i.e., 790 nm) passed through the annular zone No. 15 is substantially the same as the phase of the light flux passed through the central area Rc. The annular zone No. 15 will be referred to as the second annular region.

A ratio $h_S/h_B$ equals to 1.21 if the boundary $h_S$ between the first annular region and the second annular region, and the boundary $h_B$ between the central area Rc and the peripheral area Rh are used, which satisfies condition (1) described above.

Light intensity distribution on the recoding surface of the CD when the objective lens according to the third, fourth and fifth embodiments, which have the same basic design, will be described in comparison with that of a second comparative example which is not provided with the second annular region.

FIG. 14 is a graph showing the light intensity distribution on the recording surface of the CD when the objective lens according to the second comparative example is used. The vertical axis represents the intensity, and the horizontal axis represents a radius (unit: mm) with respect to the optical axis. The second comparative example has the same basic design as that of the third through fifth embodiments. However, as described above, the second comparative example does not have the second annular region in the peripheral area Rh, and all the annular zones in the peripheral area Rh are designed such that the wavefront aberration changing range is greater than π for the light flux having the wavelength of 790 nm.

FIGS. 15, 16 and 17 are graphs showing light intensity distributions on the recording surface of the CD when the objective lenses according to the third, fourth and fifth embodiments are used, respectively. Since the beam spot (i.e., main beam) has an significantly large intensity, the peak thereof is not shown in each graph.

The change of the main beam radius of the third, fourth and fifth embodiments, with respect to that of the second comparative example are −0.9%, 0.0% and 0.9%, respectively, which does not show any significance. However, regarding the intensity of a first side lobe, the change is −15.9% in the third embodiment, −12.1% in the fourth embodiment, and −17.3% in the fifth embodiment.

In the fourth embodiment, the second annular region is configured to be an annular zone with which the change of the wavefront aberration is more than 2π. Even though such a relatively wide annular zone is employed, the side lobe can be well suppressed as in the third embodiment.

In the fifth embodiment, the No. 12 annular zone constituting the first annular region is configured such that the phase of the light flux provided thereby is reversed with respect to the phase provided by the annular zones in the central area Rc. With this configuration, the radius of the main beam is prevented from becoming too small.

The present disclosure relates to the subject matter contained in Japanese Patent Application No. 2002-133140, filed on May 8, 2002, which is expressly incorporated herein by reference in its entirety.

What is claimed is:

1. An objective lens for an optical pickup, said optical pickup being capable of converging at least two beams having different wavelengths on data recording surfaces of at least two different optical discs at different numerical apertures, respectively, said objective lens comprising a refractive lens having a positive power, at least one surface of said refractive lens being divided into a central area having a necessary size for transmitting a lower NA beam, which is converged on an optical disc at a lower NA and a peripheral area having a size for transmitting a higher NA beam which is converged on an optical disc at a higher numerical aperture (NA), wherein, when a light beam having a wavelength corresponding to the optical disc requiring the higher NA is converged on the optical disc requiring the higher NA at the higher NA, the phase of light flux passed through said peripheral area is substantially the same as the phase of light flux passed through said central area, wherein, when a light beam having a wavelength corresponding to the optical disc requiring the lower NA is converged on the optical disc requiring the lower NA at the lower NA, the phase of light flux passed through a first annular region included in said peripheral area is different from the phase of light flux passed through said central area, and the phase of light flux passed through a second annular region, which is included in said peripheral area and outside said first region, is substantially the same as the phase of the light flux passed through said central area.

2. The objective lens according to claim 1, which satisfies a condition:

$$1.15 < h_S/h_B < 1.28,$$

wherein, $h_S$ represents a height of a boundary between said first annular region and said second annular region with respect to an optical axis of said objective lens, and $h_B$ represents a height of a boundary between said central area and said peripheral area.

3. The objective lens according to claim 1, wherein said peripheral area is formed with a diffraction lens structure including a plurality of annular zones having level differences therebetween, said second annular region including the plurality of annular zones.

4. The objective lens according to claim 3, wherein said plurality of annular zones included in said second annular region are adjacent to each other, an optical path difference at a boundary of each of adjacent annular zones is one wavelength when the light beam for the disc requiring the higher NA is used.

5. The objective lens according to claim 3, wherein said plurality of annular zones formed in said peripheral area include a wide annular zone which has a wide width in a radial direction thereof, a phase difference between light flux passed through a central area side end of said wide annular zone and light flux passed through a peripheral area side end of said wide annular zone being greater than π when the light beam for the disc requiring the lower NA is used.

6. The objective lens according to claim 3, wherein said plurality of annular zones formed in said second region include a wide annular zone which has a wide width in a radial direction thereof, a phase difference between light flux passed through a central area side end of said wide annular zone and light flux passed through a peripheral area side end of said wide annular zone being greater than 2π when the light beam for the disc requiring the lower NA is used.

7. The objective lens according to claim 1, wherein a phase of light flux passed through said first annular region is substantially reversed with respect to a phase of light flux passed through said central area when the light beam for the disc requiring the lower NA is used.

8. An objective lens for an optical pickup, said optical pickup being capable of converging at least two beams having different wavelengths on data recording surfaces of at least two different optical discs at different numerical apertures, respectively, said objective lens comprising a refractive lens having a positive power, at least one surface of said refractive lens being divided into a central area having a necessary size for transmitting a lower NA beam, which is converged on an optical disc at a lower NA and a peripheral area having a size for transmitting a higher NA beam which is converged on an optical disc at a higher numerical aperture (NA), said peripheral area being formed with a diffraction lens structure formed with a plurality of annular zones having level differences therebetween, wherein, when a light beam having a wavelength corresponding to the optical disc requiring the higher NA is converged on the optical disc requiring the higher NA at the higher NA, all of said plurality of annular zones formed in said peripheral area function to strengthen an intensity of a central portion of a beam spot, wherein, when a light beam having a wavelength corresponding to the optical disc requiring the lower NA is converged on the optical disc requiring the lower NA at the lower NA, said plurality of annular zones included in a first annular region do not function to strengthen the intensity of the central portion of a beam spot, and a plurality of annular zones included in a second annular region defined outside said first annular region have a function to strengthen the intensity of the central portion of the beam spot.

9. The objective lens according to claim 8, which satisfies a condition:

$$1.15 < h_S/h_B < 1.28,$$

wherein, $h_S$ represents a height of a boundary between said first annular region and said second annular region with respect to an optical axis of said objective lens, and $h_B$ represents a height of a boundary between said central area and said peripheral area.

* * * * *